(12) United States Patent
Tsirkin

(10) Patent No.: US 9,832,179 B2
(45) Date of Patent: Nov. 28, 2017

(54) STATELESS SERVER-BASED ENCRYPTION ASSOCIATED WITH A DISTRIBUTION LIST

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 50 days.

(21) Appl. No.: 14/631,653

(22) Filed: Feb. 25, 2015

(65) Prior Publication Data
US 2016/0248745 A1    Aug. 25, 2016

(51) Int. Cl.
*H04L 29/06*    (2006.01)
*H04L 29/08*    (2006.01)

(52) U.S. Cl.
CPC .......... *H04L 63/08* (2013.01); *H04L 63/0442* (2013.01); *H04L 63/0471* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,191,467 | B1 * | 3/2007 | Dujari | H04L 63/08 709/220 |
| 7,266,847 | B2 * | 9/2007 | Pauker | H04L 63/0442 726/27 |
| 7,493,499 | B1 * | 2/2009 | Deaver | G06F 17/30864 713/193 |
| 8,315,393 | B2 * | 11/2012 | Moreh | G06Q 20/401 380/277 |
| 8,359,357 | B2 | 1/2013 | Rodriguez et al. | |
| 8,631,227 | B2 | 1/2014 | Olechowski et al. | |
| | | (Continued) | | |

FOREIGN PATENT DOCUMENTS

WO    WO2014054009 A1    4/2014

OTHER PUBLICATIONS

Stateless Tor & PGP, 14 pages, retrieved from http://c4ss.org/statelesstor on Feb. 25, 2015.
(Continued)

*Primary Examiner* — Dede Zecher
*Assistant Examiner* — Richard A McCoy
(74) *Attorney, Agent, or Firm* — Haynes and Boone, LLP

(57) ABSTRACT

An example method of decrypting electronic messages includes receiving, by an authentication module of a decryptor device, authentication requests from a plurality of destination clients. The method also includes receiving, by a decryption module of the decryptor device, encrypted electronic messages from the plurality of destination clients. The encrypted electronic messages are derived from a common electronic message sent by a common source client. The method further includes authenticating, based on an authentication table, the plurality of destination clients. The authentication table stores user credentials that are used to authenticate destination clients. The method also includes for each encrypted electronic message received from an authenticated destination client of the plurality of destination clients, decrypting the encrypted electronic message using a common private key and providing the decrypted electronic message to the authenticated destination client. The private key is stored at the decryptor device.

20 Claims, 6 Drawing Sheets

(56) References Cited

U.S. PATENT DOCUMENTS

| | | | |
|---|---|---|---|
| 8,719,568 B1* | 5/2014 | Antypas, III | H04L 9/14 713/168 |
| 8,737,614 B1* | 5/2014 | Mulligan | G06F 21/6218 380/243 |
| 8,806,191 B2 | 8/2014 | Dickinson, III et al. | |
| 2001/0034715 A1* | 10/2001 | Shibata | H04L 9/0894 705/57 |
| 2005/0226423 A1* | 10/2005 | Li | H04L 63/062 380/278 |
| 2006/0053280 A1* | 3/2006 | Kittle | H04L 63/0428 713/156 |
| 2006/0282864 A1* | 12/2006 | Gupte | H04N 7/17318 725/89 |
| 2007/0282749 A1* | 12/2007 | Nonaka | G11B 20/00086 705/51 |
| 2008/0165972 A1* | 7/2008 | Worthington | H04L 63/06 380/278 |
| 2010/0278453 A1* | 11/2010 | King | G06Q 10/10 382/321 |
| 2011/0238991 A1* | 9/2011 | Schipper | H04N 7/163 713/168 |
| 2012/0023326 A1 | 1/2012 | Kalan et al. | |
| 2013/0018960 A1* | 1/2013 | Knysz | H04L 65/403 709/204 |
| 2013/0022196 A1* | 1/2013 | Kambayashi | H04L 9/0836 380/44 |
| 2013/0163762 A1* | 6/2013 | Zhang | H04B 7/155 380/270 |
| 2013/0254117 A1* | 9/2013 | von Mueller | G06Q 20/3829 705/71 |
| 2015/0149775 A1* | 5/2015 | Gadotti | H04L 63/0464 713/168 |
| 2015/0172044 A1* | 6/2015 | Teranishi | H04L 9/008 380/28 |
| 2017/0149564 A1* | 5/2017 | McCallum | G06F 21/6209 |

OTHER PUBLICATIONS

Giuseppe Ateniese, Cristina Nita-Rotaru; Stateless-Recipient Certified E-mail System Based on Veriable Encryption, 2002, 18 pages, Department of Computer Science The Johns Hopkins University retrieved from http://www.cs.jhu.edu/~ateniese/papers/rsa2002.pdf on Feb. 25, 2015.

Martijn Brinkers, Encrypted Email in the Cloud, Jun. 29, 2014, 3 pages, retrieved from https://www.ciphermail.com/blog/encrypted-email-in-the-cloud.html on Feb. 25, 2015.

Clearswift Information Governance; Sep. 2, 2013, 30 pages; retrieved from http://cyberhub.clearswift.com/system/files/clearswift-portal-implementation-guide.pdf on Feb. 25, 2015.

* cited by examiner

STATELESS SERVER-BASED ENCRYPTION ASSOCIATED WITH A DISTRIBUTION LIST

FIELD OF DISCLOSURE

The present disclosure generally relates to computing devices, and more particularly to decrypting electronic messages using a common private key.

BACKGROUND

Data that can be read and understood without any special measures is called plaintext or clear text. Disguising plaintext in such a way as to hide its substance is called encryption. Encrypting plaintext results in unreadable gibberish called cipher-text. A message may be encrypted to ensure that information in the message is hidden from anyone for whom it is not intended, even those who can see the encrypted data. In order for the intended recipient to be able to eventually read the message, the encrypted message is decrypted.

Pretty Good Privacy (PGP) encryption allows for securing communications end to end, but suffers from the problem that public keys for all recipients need to be known. This may be a problem in cases where the source of the message might not know all recipients, such as public distribution lists. The recipients can share a private key, but then access may not be easily revoked without revoking the private from everyone.

BRIEF SUMMARY

The present disclosure provides techniques to decrypt electronic messages. Methods, systems, and techniques for decrypting electronic messages are provided.

According to an embodiment, a method of decrypting electronic messages includes receiving, by an authentication module of a decryptor device, authentication requests from a plurality of destination clients. The method also includes receiving, by a decryption module of the decryptor device, encrypted electronic messages from the plurality of destination clients. The encrypted electronic messages are derived from a common electronic message sent by a common source client. The method further includes authenticating, based on an authentication table, the plurality of destination clients. The authentication table stores user credentials that are used to authenticate destination clients. The method also includes for each encrypted electronic message received from an authenticated destination client of the plurality of destination clients, decrypting the encrypted electronic message using a common private key and providing the decrypted electronic message to the authenticated destination client. The private key is stored at the decryptor device.

According to another embodiment, a system for decrypting electronic messages includes an authentication module that receives authentication requests from a plurality of destination clients and authenticates, based on an authentication table, the plurality of destination clients. The authentication table stores user credentials that are used to authenticate destination clients. The system also includes a decryptor module that receives encrypted electronic messages from the plurality of destination clients. For each encrypted electronic message received from an authenticated destination client, the decryptor module decrypts the encrypted electronic message using a common private key and provides the decrypted electronic message to the authenticated destination client. The authentication module and decryption module are executable in a decryptor device at which the private key is stored, and the encrypted electronic messages are derived from a common electronic message sent by a common source client.

According to another embodiment, a non-transitory machine-readable medium includes a plurality of machine-readable instructions that when executed by one or more processors are adapted to cause the one or more processors to perform a method including: receiving, by an authentication module of a decryptor device, authentication requests from a plurality of destination clients; receiving, by a decryption module of the decryptor device, encrypted electronic messages from the plurality of destination clients, the encrypted electronic messages being derived from a common electronic message sent by a common source client; authenticating, based on an authentication table, the plurality of destination clients, the authentication table storing user credentials that are used to authenticate destination clients; and for each encrypted electronic message received from an authenticated destination client of the plurality of destination clients, decrypting the encrypted electronic message using a common private key and providing the decrypted electronic message to the authenticated destination client, where the private key is stored at the decryptor device.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Process Flows
   A. Send Encrypted Electronic Message to Destination Clients Specified in a Distribution List
   B. Send Decrypted Messages Back to Authenticated Destination Clients
   C. Do Not Send Decrypted Messages to Unauthenticated Destination Clients
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

In an embodiment, a method of decrypting electronic messages includes receiving, by an authentication module of a decryptor device, authentication requests from a plurality of destination clients. The method also includes receiving, by a decryption module of the decryptor device, encrypted electronic messages from the plurality of destination clients. The encrypted electronic messages are derived from a common electronic message sent by a common source client. The method further includes authenticating, based on an authentication table, the plurality of destination clients. The authentication table stores user credentials that are used to authenticate destination clients. The method also includes for each encrypted electronic message received from an authenticated destination client of the plurality of destination clients, decrypting the encrypted electronic message using a common private key and providing the decrypted electronic message to the authenticated destination client. The private key is stored at the decryptor device

II. Example System Architecture

Figure 1:
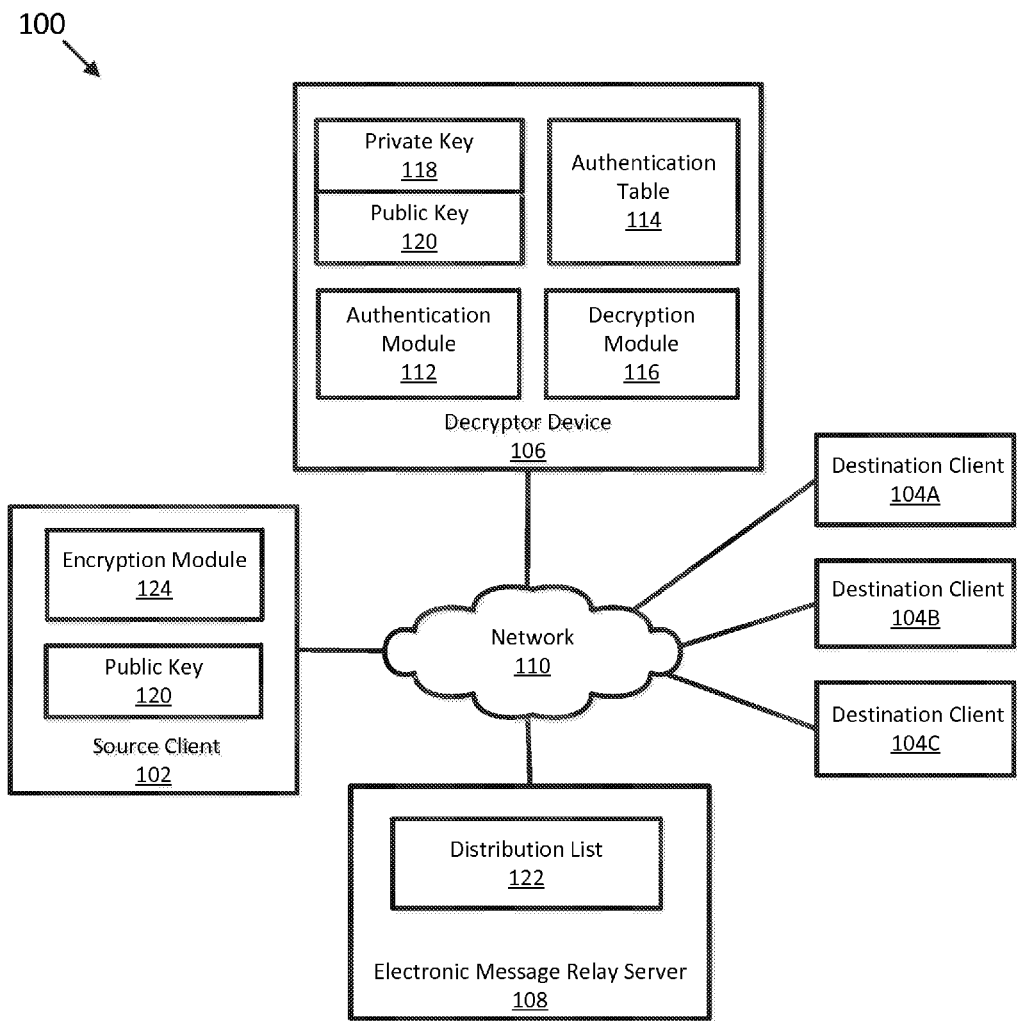
FIG. 1 is a block diagram illustrating a system for encrypting and decrypting electronic messages, according to some embodiments.

FIG. 1 is a block diagram illustrating a system 100 for encrypting and decrypting electronic messages, according to some embodiments. System 100 includes a source client 102, a plurality of destination clients 104A-104C, a decryptor device 106, and an electronic message relay server 108 coupled over a network 110. Network 110 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Decryptor device 106 includes an authentication module 112 and authentication table 114. Authentication module 112 receives authentication requests from destination clients and uses authentication table 114 to authenticate the destination clients. Authentication table 114 may, for example, store usernames and passwords of authenticated users, internet protocol (IP) addresses of authenticated users, or other user authentication information.

Decryptor device 106 also includes a decryption module 116, private key 118, and public key 120. In an example, decryptor device 106 may generate matching private and public keys. In such an example, decryption module 116 generates private key 118 and generates public key 120, which is paired with private key 118. In another example, a key generation service generates matching private and public keys and provides decryptor device 106 with the matching keys. Private key 118 and public key 120 may be paired such that an electronic message that is encrypted using public key 120 may be decrypted using private key 118. In an example, decryptor device 106 publishes public key 120 and receives an encrypted message that was encrypted using public key 120. In such an example, decryption module 116 decrypts the encrypted message using private key 118. In this way, the public key may be used by any entity desiring to send an encrypted message and the decryption module 116 may use the same matching private key to decrypt encrypted messages encrypted with the public key. Additionally, it may be advantageous for an entity that is separate from the destination endpoint of an encrypted message to decrypt the encrypted message. For, the private key may be revoked by revoking it from one entity (decryptor device 106) rather than all of the destination endpoints, and security may be enhanced because the private key is stored at one entity rather than all of the destination endpoints.

Electronic message relay server 108 includes a distribution list 122 that specifies a plurality of destination clients. In an example, distribution list 122 specifies destination clients 104A-104C. Although electronic message relay server 108 is illustrated as including one distribution list, it should be understood that electronic message relay server 108 may include more than one distribution list. Each of the distribution lists may include the same or different destinations clients.

A source client may desire to send an electronic message to the destination clients specified in distribution list 122. Source client 102 includes an encryption module 124 and a public key 120. Encryption module 124 may encrypt the electronic message using public key 120 and send the encrypted message to electronic message relay server 108 for distribution to the destination clients specified in distribution list 122. Electronic message relay server 108 may forward the encrypted electronic message to the destination clients listed in distribution list 122.

III. Example Process Flows

Figure 2:
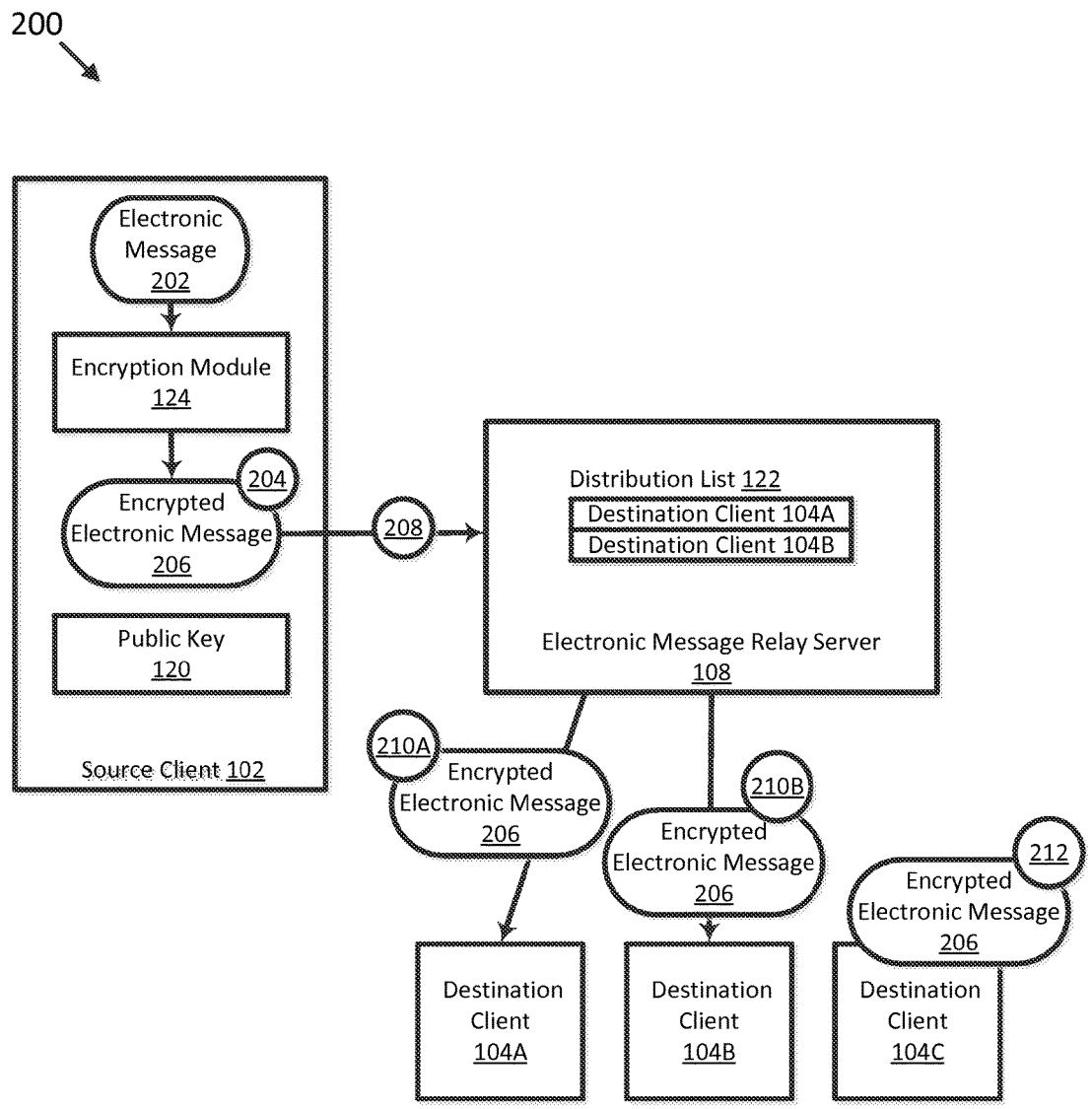
FIG. 2 is a process flow of a source client sending an encrypted message to a plurality of destination clients specified in a distribution list, according to some embodiments.

A. Send Encrypted Electronic Message to Destination Clients Specified in a Distribution List FIG. 2 is a process flow 200 of a source client sending an encrypted message to a plurality of destination clients specified in a distribution list, according to some embodiments. In FIG. 2, source client 102 may desire to send a message 202 to the plurality of destination clients specified in distribution list 122. At an action 204, encryption module 124 uses public key 120 to encrypt electronic message 202, and produces an encrypted electronic message 206 based on the encryption. Public key 120 may be published by an entity such as decryptor device 106 or another entity. In an example, source client 102 may dynamically retrieve public key 120 and encryption module 124 may encrypt message 202 using the private key. Source client 102 may desire to send another message and dynamically retrieve another public key, and encryption module 124 may use this other public key to encrypt the other message.

At an action 208, encryption module 124 sends encrypted electronic message 206 to electronic message relay server 108 for distribution to the destination clients specified in distribution list 122. In FIG. 2, distribution list 122 identifies destination client 104A and destination client 104B, and does not include destination client 104C. It should also be understood that electronic message relay server 108 may store more than one distribution list that source client 102 can specify as the destination clients of the message. In an example, an encrypted channel may be set up between source client 102 and electronic message relay server 108 and/or between electronic message relay server 108 and a destination client. In such an example, the plain text of a message may be discrete and not exposed to third parties.

At an action 210, electronic message relay server 108 distributes encrypted electronic message 206 to each of the destination clients specified in distribution list 122. For example, at an action 210A, electronic message relay server 108 sends encrypted electronic message 206 to destination client 104A. In an example, electronic message relay server 108 discards the encrypted electronic message 206 after the distribution to those destination clients specified in distribution list 122. In such an example, it may be unnecessary for electronic message relay server 108 to store any state regarding the message.

At an action 210B, electronic message relay server 108 sends encrypted electronic message 206 to destination client 104B. Each of the destination clients specified in distribution list 122 may receive encrypted electronic message 206. At an action 212, destination client 104C receives encrypted electronic message 206. In some examples, destination client 104C is a snooper and obtained encrypted electronic message 206 from snooping on network 110.

Encrypted electronic message 206 is derived from a common electronic message (message 202) and is sent by a common source client (source client 102). In some examples, the payload of the encrypted electronic messages received by the plurality of destination clients is the same. Destination clients 104A-104C receive encrypted electronic message 206 in encrypted form. Decryptor device 106 and encrypted electronic message 206 may be separate entities. To read encrypted electronic message 206, destination clients 104A-104C may use decryptor device 106 to decrypt the message. In some examples, electronic message relay server 108 discards the encrypted electronic message 206 after the distribution to those destination clients specified in distribution list 122.

B. Send Decrypted Messages Back to Authenticated Destination Clients

Figure 3:
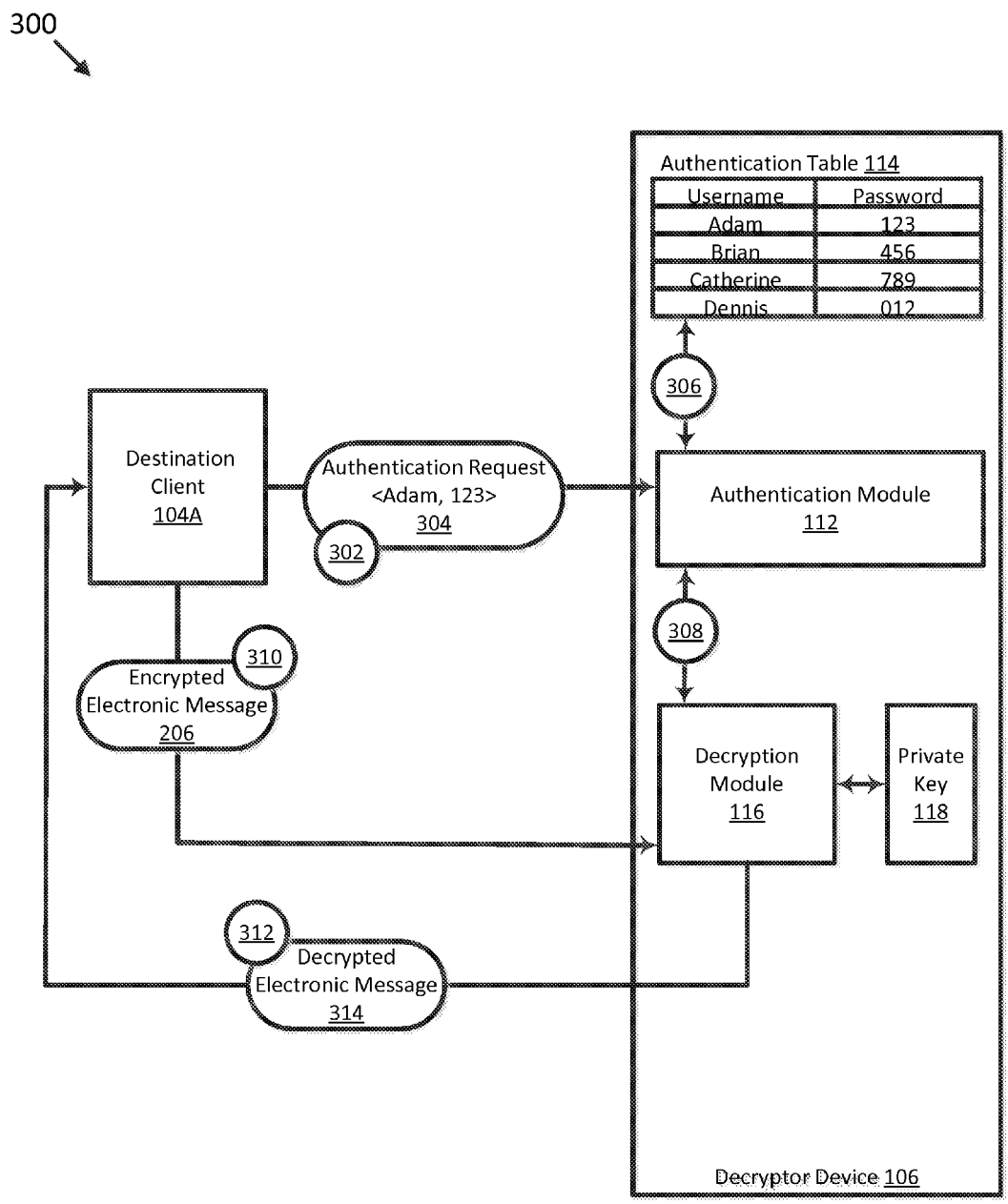
FIG. 3 is a process flow of a decryptor device processing an encrypted message received from an authenticated destination client, according to some embodiments.

FIG. 3 is a process flow 300 of a decryptor device processing an encrypted message received from an authenticated destination client, according to some embodiments. In FIG. 3, authentication table 114 stores user credentials that are used to authenticate destination clients, and authentication module 112 uses authentication table 114 to authenticate destination clients. For example, authentication table 114 has four entries of authenticated destination clients based on usernames and passwords. In this example, if a destination client provides the username "Adam" and password "123," the username "Brian" and password "456," the username "Catherine" and password "789," or the username "Dennis" and password "012," the destination client is authenticated by the authentication module 112. In an example, an encrypted channel may be set up between a destination client and decryptor device 106. In such an example, the plain text of a message may be discrete and not exposed to third parties.

At an action 302, destination client 104A sends an authentication request 304 to authentication module 112. Authentication request 304 includes the user credentials <username "Adam" and password "123">. Authentication module 112 receives authentication request 304 from destination client 104A. At an action 306, authentication module 112 authenticates destination client 104A based on authentication table 114. In the example illustrated in FIG. 3, authentication module 112 finds the user credentials included in authentication request 304 in authentication table 114 and accordingly authenticates destination client 104A. At an action 308, authentication module 112 may send a notification to decryption module 116 that destination client 104A has been authenticated.

At an action 310, destination client 104A sends encrypted electronic message 206 to decryption module 116 to decrypt the message. Decryption module 116 receives encrypted electronic message 206 from destination client 104A and knows that destination client 104A has been authenticated. At an action 312, decryption module 116 decrypts encrypted electronic message 206 using private key 118 stored at decryptor device 106, and produces a decrypted electronic message 314 for the authenticated destination client. Decryption module 116 sends decrypted electronic message 314 to authenticated destination client 104A. In an example, decryption module 116 discards the encrypted message from a destination client and also the decrypted electronic message after the decrypted message is sent to the destination client. In such an example, it may be unnecessary for decryption module 116 to store any state regarding the message.

In some examples, decryption module 116 identifies the public key that was used to encrypt encrypted electronic message 206 and retrieves the private key that is paired with the public key. Destination client 104A receives decrypted electronic message 314 and may open it up and view the message. Decrypted electronic message 314 may be electronic message 202 (see FIG. 2). It should also be understood that a destination client may send an authentication request with the encrypted electronic message. In some examples, decryption module 116 receives from a destination client an identifier of the public key that was used to encrypt electronic message 206, and retrieves, based on the identifier, the private key to decrypt the encrypted electronic message. The identifier may be associated with the distribution list, and decryption module 116 uses the identifier to lookup the private key. The identifier associated with the distribution list of the destination client may be, for example, included in the message header in the address of the mailing list such as in the "To:" field.

Similar actions may be performed with respect to other authenticated destination clients (e.g., destination client 104B). For example, destination client 104B may send an authentication request to authentication module 112, where the authentication request includes the user credentials <username "Catherine" and password "789">. Authentication module 112 may receive the authentication request from destination client 104B and authenticate destination client 104B based on authentication table 114. In this example, authentication module 112 finds the user credentials included in destination client 104B's authentication request in authentication table 114 and thus authenticates destination client 104B. Authentication module 112 may send a notification to decryption module 116 that destination client 104B has been authenticated. Destination client 104B may send encrypted electronic message 206 to decryption module 116 to decrypt. Accordingly, destination clients 104A and 104B may send decryption module the same encrypted electronic message. Decryption module 116 receives encrypted electronic message 206 from destination client 104B, and decrypts encrypted electronic message 206 using private key 118 to produce a decrypted electronic message for authenticated destination client 104B. Decryption module 116 sends the decrypted electronic message to destination client 104B, which may then open it up and view the message.

Accordingly, decryption module 116 may receive a set of encrypted electronic messages including a first encrypted electronic message (from destination client 104A) and a second encrypted electronic message (from destination client 104B), and decrypt each of the first and second encrypted electronic messages using the same private key (private key 118). The first and second encrypted electronic message received from destination clients 104A and 104B may have the same payload and be the same message.

C. Do Not Send Decrypted Messages to Unauthenticated Destination Clients

Figure 4:
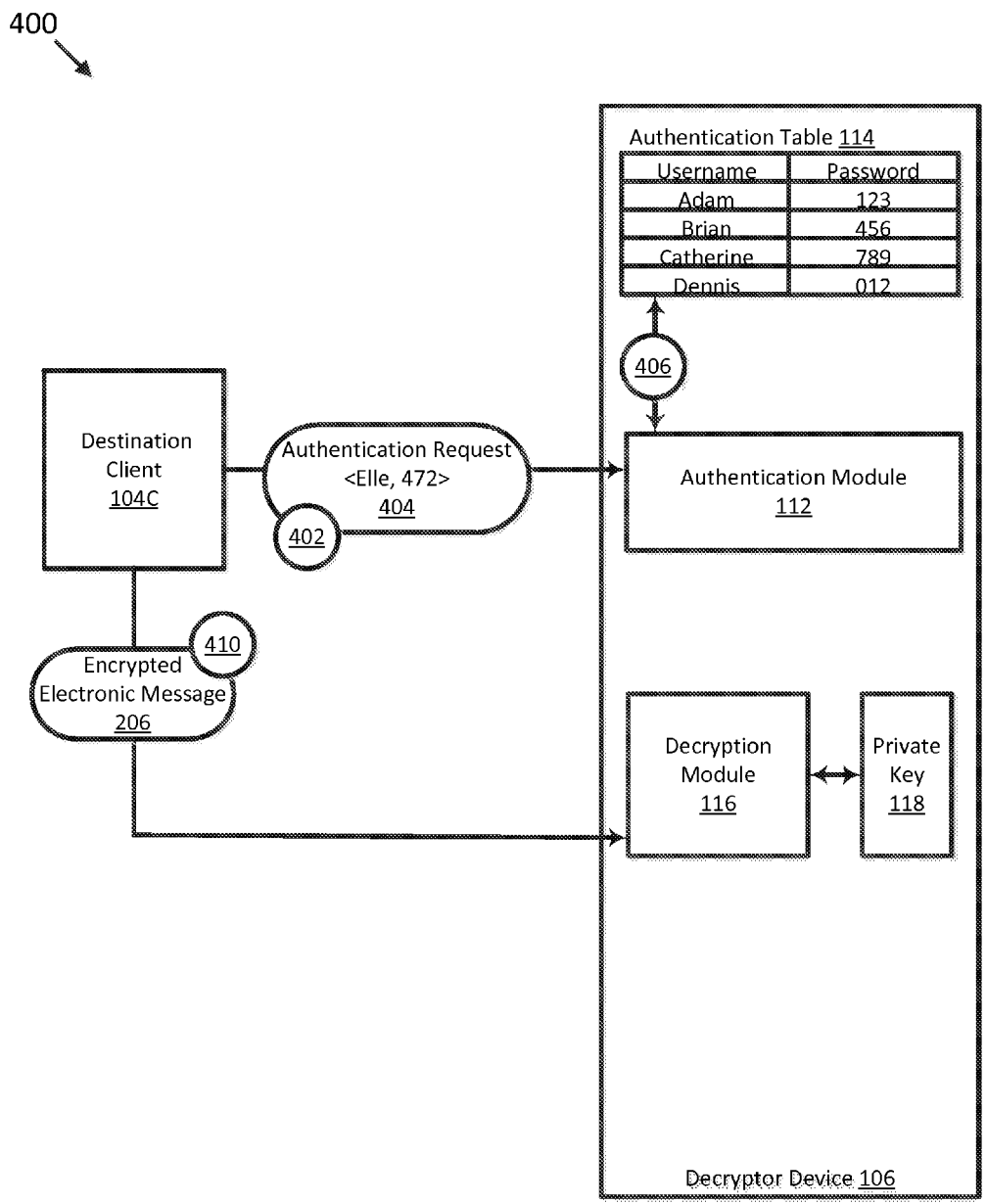
FIG. 4 is a process flow of the decryptor device processing an encrypted message received from an unauthenticated destination client, according to some embodiments.

FIG. 4 is a process flow 400 of the decryptor device processing an encrypted message received from an unauthenticated destination client, according to some embodiments. At an action 402, destination client 104C sends an authentication request 404 including the user credentials <username "Elle" and password "472"> to authentication module 112. Authentication module 112 receives authentication request 404 from destination client 104C. At an action 406, authentication module 112 authenticates destination client 104C based on authentication table 114.

In the example illustrated in FIG. 4, authentication module 112 does not find the user credentials included in authentication request 404 in authentication table 114 and accordingly does not authenticate destination client 104C. As such, authentication module 112 does not send a notification to decryption module 116 that destination client 104C has been authenticated. At an action 410, destination client 104C sends encrypted electronic message 206 to decryption module 116 to decrypt. Decryption module 116 may receive encrypted electronic message 206 from destination client 104C and determine that destination client 104C has not been authenticated. Accordingly, decryption module 116 does not decrypt encrypted electronic message 206, and does not send a decrypted message back to destination client 104C. In some examples, decryption module 116 sends destination client 104C a message that it has failed authentication. Similar actions may be performed with respect to other unauthenticated destination clients.

As discussed above and further emphasized here, FIGS. 1-4 are merely examples, which should not unduly limit the scope of the claims. For example, although decryption module 116 may be informed of which destination clients have been authenticated by authentication module 112 via a notification from authentication module 112, decryption module 116 may be informed of which destination clients have been authenticated by authentication module 112 through other ways. For example, authentication module 112 may provide each authenticated destination client with an authentication token and the destination client provides to decryption module 116. Based on receiving this authentication token, decryption module 116 may determine that the destination client has been authenticated.

IV. Example Method

Figure 5:
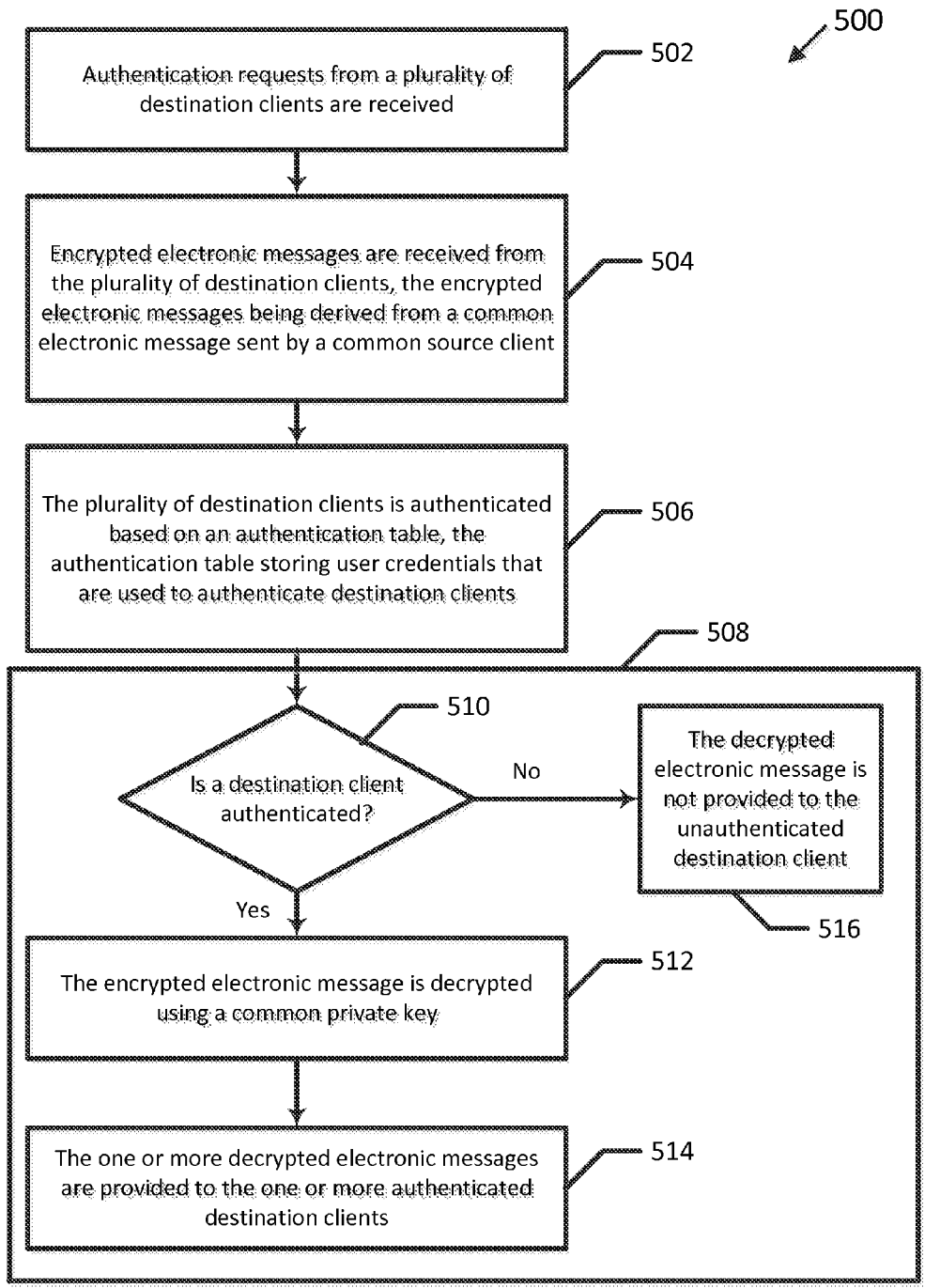
FIG. 5 is a flowchart illustrating a method of decrypting electronic messages, according to some embodiments.

FIG. 5 is a flowchart illustrating a method 500 of decrypting electronic messages, according to some embodiments. Method 500 is not meant to be limiting and may be used in other applications.

In FIG. 5, method 500 includes blocks 502-516. In a block 502, authentication requests from a plurality of destination clients are received. In an example, authentication module 112 receives authentication requests from each of destination clients 104A, 104B, and 104C. In a block 504, encrypted electronic messages are received from the plurality of destination clients, the encrypted electronic messages being derived from a common electronic message sent by a common source client. In an example, decryption module 116 receives encrypted electronic messages 206 from destination client 104A, destination client 104B, and destination client 104C, and encrypted electronic message 206 is derived from common electronic message 202 sent by common source client 102.

In a block 506, the plurality of destination clients is authenticated based on an authentication table, the authentication table storing user credentials that are used to authenticate destination clients. In an example, authentication module 112 authenticates, based on authentication table 114, destination client 104A, destination client 104B, and destination client 104C, where authentication table 114 stores user credentials that are used to authenticate destination clients.

Actions in a block 508 may be performed for each encrypted electronic message that is received by decryption module 116. In a block 510, it is determined whether a destination client that sent an authentication request is authenticated. This may be determined for each destination client that sends an authentication request to decryption module 116. Process flow proceeds from block 510 to a block 512 if the destination client is authenticated. In a block 512, the encrypted electronic message is decrypted using a common private key. In an example, decryption module 116 decrypts encrypted electronic message 206 using a common private key 118 stored at decryptor device 106. In a block 514, the decrypted electronic message is provided to the authenticated destination client. In an example, decryption module 116 provides decrypted electronic message 314 to authenticated destination clients 104A and 104B. In this example, the same decrypted electronic message may be sent to each of the authenticated destination clients.

Process flow proceeds from block 510 to a block 516 if the destination client is not authenticated (the authentication failed with respect to the destination client). In block 516, the decrypted electronic message is not provided to the unauthenticated destination client. In an example, decryption module 116 does not provide decrypted electronic message 314 to unauthenticated destination client 104C.

In some embodiments, one or more actions illustrated in blocks 502-516 may be performed for any number of encrypted messages received by decryptor device 106 from destinations clients. It is also understood that additional processes may be performed before, during, or after steps 502-516 discussed above. It is also understood that one or more of the steps of method 500 described herein may be omitted, combined, or performed in a different sequence as desired

V. Example Computing System

Figure 6:
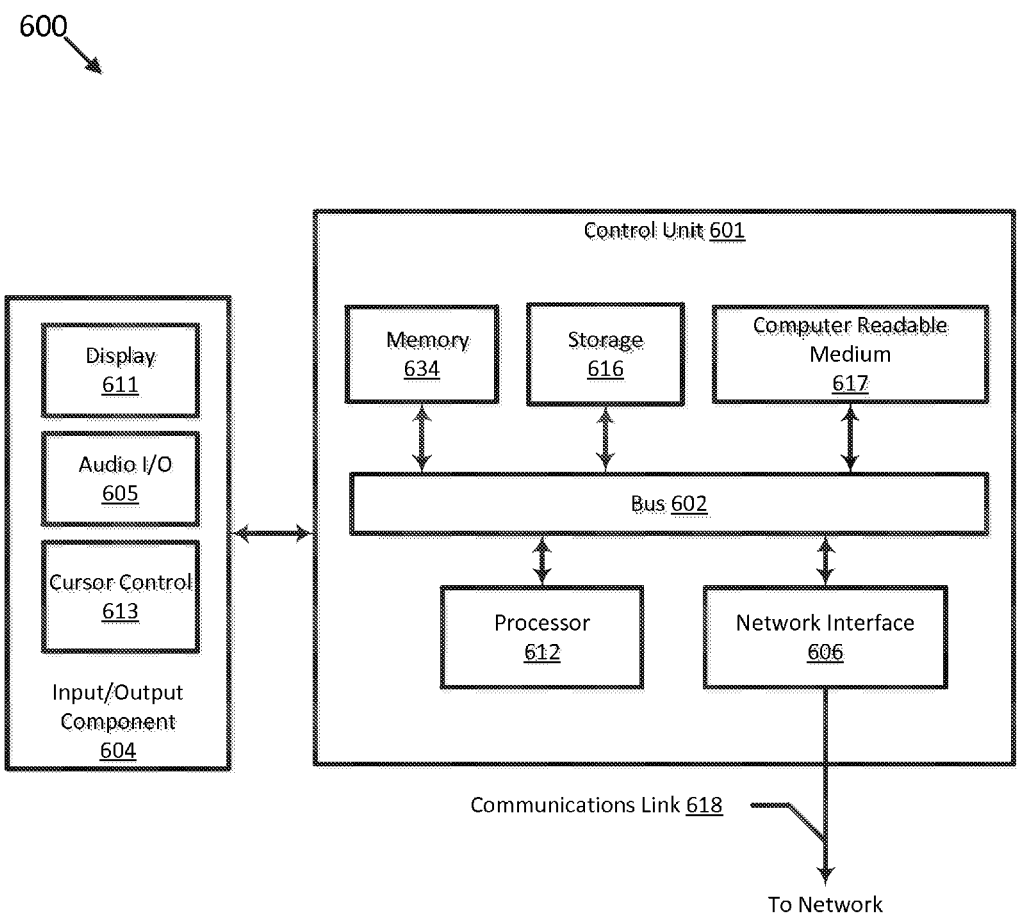
FIG. 6 is a block diagram of an electronic system suitable for implementing one or more embodiments of the present disclosure.

FIG. 6 is a block diagram of an example computer system 600 suitable for implementing any of the embodiments disclosed herein. In various implementations, each of source client 102, destination clients 104A-104C, decryptor device 106, and electronic message relay server 108 may be implemented on computer system 600. The computer system 600 may include one or more processors 612. The computer system 600 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 for processing user actions, such as selecting keys from a keypad/keyboard or selecting one or more buttons or links, etc., and sending a corresponding signal to bus 602. I/O component 604 may also include an output component such as a display 611, and an input control such as a cursor control 613 (such as a keyboard, keypad, mouse, etc.).

An audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 618 to a network. In an embodiment, the transmission is wireless, although other transmission mediums and methods may also be suitable. A processor 612, which may be a micro-controller, digital signal processor (DSP), or other processing component, processes these various signals, such as for display on display 611 of computer system 600 or transmission to other devices via communications link 618. A processor may also control transmission of information, such as cookies or IP addresses, to other devices.

Components of computer system 600 also include a system memory component 634 (e.g., RAM), a static storage component 616 (e.g., ROM), and/or a computer readable medium 617. Computer system 600 performs specific operations by one or more processors 612 and other components by executing one or more sequences of instructions contained in system memory component 634. Logic may be encoded in computer readable medium 617, which may refer to any medium that participates in providing instructions to one or more processors 612 for execution. Such a medium may take many forms, including but not limited to, non-volatile media, volatile media, and transmission media.

In various implementations, non-volatile media include optical, or magnetic disks, or solid-state drives, volatile media include dynamic memory, such as system memory component 634, and transmission media include coaxial cables, copper wire, and fiber optics, including wires that include bus 602. In an embodiment, the logic is encoded in non-transitory computer readable medium. Computer readable medium 617 may be any apparatus that can contain, store, communicate, propagate, or transport instructions that are used by or in connection with processor 612. Computer readable medium 617 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 500) to practice the present disclosure may be performed by computer system 600. In various other embodiments of the present disclosure, a plurality of computer systems 600 coupled by communication links 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of decrypting electronic messages, comprising:
    receiving, by a decryption module of the decryptor device, a first encrypted electronic message from a first destination client;
    receiving, by the decryption module of the decryptor device, a second encrypted electronic message from a second destination client, the first and second encrypted electronic messages being derived from a common electronic message, and the common electronic message sent by a common source client and encrypted using a common public key;
    determining that the first and second destination clients have been successfully authenticated;
    in response to a determination that the first destination client has been successfully authenticated, decrypting, by the decryption module, the first encrypted electronic message using a common private key stored at the decryptor device, the first and second destination clients being listed in a distribution list that is associated with the common private key;
    in response to a determination that the second destination client has been successfully authenticated, decrypting, by the decryption module, the second encrypted electronic message using the common private key stored at the decryptor device; and
    providing the decrypted electronic message to each of the first and second destination clients.

2. The method of claim 1, further including:
    receiving, by the decryptor module, an identifier of the public key, the identifier being from the first destination client; and
    retrieving, based on the identifier, the private key to decrypt the encrypted electronic message.

3. The method of claim 1, further including:
generating, by the decryptor module, the private key; and
generating, by the decryptor module, the public key that is paired with the private key.

4. The method of claim 1, wherein the distribution list is stored at a message relay server.

5. The method of claim 1, further including:
authenticating, based on an authentication table, the plurality of destination clients, the authentication table storing user credentials that are used to authenticate destination clients; and
for each encrypted electronic message received from an unauthenticated destination client of the plurality of destination clients, sending a message indicating that the authentication failed to the unauthenticated destination client.

6. A system for decrypting electronic messages, comprising:
a decryptor module that receives a first encrypted electronic message from a first destination client, receives a second encrypted electronic message from a second destination client, and receives an indication that the first and second destination clients have been successfully authenticated,
wherein the decryptor module decrypts each of the first and second encrypted electronic messages using the same private key and provides the decrypted electronic message to each of the first and second destination clients, wherein the first and second destination clients are listed in a distribution list that is associated with the common private key,
wherein the first and second encrypted electronic messages are derived from a common electronic message, and the common electronic message is sent by a common source client and is encrypted using the same public key.

7. The system of claim 6, wherein the first destination client receives the first encrypted electronic message from a message relay server.

8. The system of claim 7, wherein the message relay server receives the common electronic message from the common source client and stores the distribution list identifying at least the first and second destination clients.

9. The system of claim 8, wherein the common source client encrypts the common electronic message using the public key and sends the encrypted message to the message relay server for delivery to the destination clients identified in the distribution list, wherein the public key is paired with the private key, and the message relay server discards the encrypted message after distribution by the message relay server of the encrypted message to the destination clients identified in the distribution list.

10. The system of claim 6, wherein a payload of the first and second encrypted electronic messages is the same.

11. A non-transitory machine-readable medium comprising a plurality of machine-readable instructions that when executed by one or more processors is adapted to cause the one or more processors to perform a method comprising:
receiving, by a decryption module of the decryptor device, a first encrypted electronic message from a first destination client;
receiving, by the decryption module of the decryptor device, a second encrypted electronic message from a second destination client, the first and second encrypted electronic messages being derived from a common electronic message, and the common electronic message sent by a common source client and encrypted using a common public key;
determining that the first and second destination clients have been successfully authenticated;
in response to a determination that the first destination client has been successfully authenticated, decrypting, by the decryption module, the first encrypted electronic message using a common private key stored at the decryptor device, the first and second destination clients being listed in a distribution list that is associated with the common private key;
in response to a determination that the second destination client has been successfully authenticated, decrypting, by the decryption module, the second encrypted electronic message using the common private key stored at the decryptor device; and
providing the decrypted electronic message to each of the first and second destination clients.

12. The method of claim 1, wherein the public key is the decryption module's public key.

13. The system of claim 6, further comprising:
a message relay server that receives the first encrypted electronic message from the common source client, retrieves the distribution list that is associated with the first encrypted electronic message and specifies a plurality of destination clients, and sends the first encrypted electronic message to the first and second destination clients of the plurality of destination clients, wherein the first encrypted electronic message is the same as the second encrypted electronic message.

14. The system of claim 13, wherein the common source client encrypts the common electronic message using the public key to produce the first and second encrypted electronic messages and sends the first encrypted electronic message to the message relay server for distribution to destination clients specified in the distribution list.

15. The system of claim 13, wherein the first destination client sends an authentication request to the decryptor device and sends the first encrypted electronic message to the decryptor device for decryption, and wherein in response to being authenticated by the decryptor device, the first destination client receives the decrypted electronic message.

16. The system of claim 6, wherein the private key used to decrypt the first and second electronic messages is the decryption module's private key and the public key is the decryption module's public key.

17. The system of claim 9, wherein the decryptor module receives an identifier associated with the distribution list from the first destination client and uses the identifier to retrieve the private key.

18. The system of claim 9, wherein the decryptor module publishes the public key.

19. The system of claim 6, further comprising:
an authentication table storing user credentials that are used to authenticate one or more destination clients; and
an authentication module that receives authentication requests from a plurality of destination clients and authenticates, based on the authentication table, the plurality of destination clients.

20. The method of claim 1, wherein the first destination client is different from the second destination client.

* * * * *